United States Patent
Wheatley

(10) Patent No.: US 6,439,640 B1
(45) Date of Patent: Aug. 27, 2002

(54) PIVOTING RAIL HAVING TONNEAU COVER SYSTEM

(76) Inventor: Donald G. Wheatley, 4451 Ford Rd., Ann Arbor, MI (US) 48105

(*) Notice: Subject to any disclaimer, the term of this patent is extended or adjusted under 35 U.S.C. 154(b) by 0 days.

(21) Appl. No.: 09/781,769

(22) Filed: Feb. 12, 2001

(51) Int. Cl.[7] .................................................. B60P 7/04
(52) U.S. Cl. ................................... 296/100.18; 160/371
(58) Field of Search ...................... 296/100.18, 100.17, 296/100.16, 100.15, 100.06, 37.6; 160/327, 371

(56) References Cited

U.S. PATENT DOCUMENTS

| | | | | |
|---|---|---|---|---|
| 4,279,064 A | * | 7/1981 | Simme ............... | 296/100.16 X |
| 5,322,336 A | * | 6/1994 | Isler .................... | 296/100.18 X |
| 5,860,691 A | * | 1/1999 | Thomsen et al. ...... | 296/100.18 |
| 6,086,135 A | * | 7/2000 | Bourgois ........... | 296/100.06 X |

FOREIGN PATENT DOCUMENTS

| | | | | |
|---|---|---|---|---|
| FR | 2225599 | * | 4/1973 | ................. 160/327 |
| JP | 4-325315 | * | 11/1992 | ............ 296/100.06 |
| JP | 6-219159 | * | 8/1994 | ............ 296/100.06 |
| JP | 6-255371 | * | 9/1994 | ............ 296/100.06 |

OTHER PUBLICATIONS

Tekstyle Quick Hatch Installation Instructions (Undated).
Sport Masters Hinged Slant–Side Cover Easy Installation Instructions (Undated).
Rail Tonneau Systems by LeBra, Installation Instruction (02/99).
Craftec, Vinyl Tonneau Cover Assembly Instructions (Undated).

* cited by examiner

*Primary Examiner*—Stephen T. Gordon
*Assistant Examiner*—Patricia Engle
(74) *Attorney, Agent, or Firm*—Harness, Dickey & Pierce, P.L.C.

(57) ABSTRACT

A pivoting rail assembly for use in a tonneau cover for covering an area of a vehicle, the vehicle area being bounded by spaced walls and the walls including a forward wall, side walls and a rear wall. The pivoting rail assembly comprises an elongated base rail having a pivot portion and a conjunct feature and further comprises a pivot rail having pivot portion and a conjunct feature. The pivot portions are cooperatively engaged and permit relative rotational movement of the base and pivot rails between a closed position, an open position and a release position. The conjunct features are cooperatively engaged in the closed and open positions to prevent the base and pivot rails from disengaging. In the release position, the conjunct features are not cooperatively engaged and the pivot rail is disengageable from the base rail. The conjunct features are disengaged from one another solely as a result of movement of the base rail and the pivot rail into the release position.

15 Claims, 6 Drawing Sheets

PIVOTING RAIL HAVING TONNEAU COVER SYSTEM

BACKGROUND OF THE INVENTION

This invention relates to tonneau covers for enclosing the cargo area of a vehicle, such as a pickup truck, and in particular to a soft tonneau cover having a pivot assembly located adjacent to the vehicle cab. The pivot assembly enables the cover to be lifted or pivoted opened from the vehicle tailgate area. Beyond a determined angle of opening, the pivot assembly allows removal of the tonneau cover.

Tonneau covers which pivot about the front or cab wall of a pick up truck cargo box are known as tip-up tonneau covers. Tip-up tonneau covers are predominately of a rigid or hard construction but can also be of a soft or fabric construction.

The hard tonneau cover has the disadvantages of being heavy and cumbersome. A typical hard tonneau cover is made of fiberglass and weighs well in excess of 200 pounds. Because of its size and awkwardness to handle, it requires two or more persons to remove the cover from the cargo box. The weight of the cover also requires robust and expensive hardware to attach the cover to the pickup bed and to allow counterbalancing of the cover while being pivoted in normal use. The hard tonneau is also cumbersome to ship, requiring motor freight delivery because of the large size and weight.

Typically, the hard tip-up tonneau cover pivots from the front of the cargo box using a hinge. An arrangement is provided to disassemble the hinge and remove the cover while leaving a base rail attached to the top of the cargo box forward wall. Reassembly of the hinge requires precise alignment which is difficult while supporting the tonneau. Furthermore, the hinge assembly must not allow water shed from the cover to enter the cargo box. The tonneau is supported by gas struts, when open, and lockable in the tailgate region of the cargo box when closed.

The soft tonneau cover consists of flexible fabric cover attached to a rectangular frame conforming and secured to the top of the cargo box. Numerous mechanisms have been used to attach flexible sheet tonneau covers to the frame. The two most commercially popular mechanisms are snap fasteners and a continuous hook fastener, known as a J-hook, that engages with a flange to mount the tonneau cover flexible sheet. Typically, lateral bow supports are provided between opposing side rails of the frame to tension the fabric.

The soft tip-up tonneau emulates the pivoting opening and closing motion of the hard tip-up tonneau using soft tonneau technology. One popular method of making a soft tip-up tonneau is to cut the side rails of the frame mid-way and insert a pivot mechanism. The front portion of the tonneau frame is clamped to the forward area of the cargo box and the rear portion of the tonneau frame can pivot for opening and closing. The fabric conforms to each respective portion of the frame and, being flexible, allows motion where necessary. A gas strut is provided to support the rear portion of the tonneau when opened and, using an over-center mechanism, to keep the hinge closed when not opened. Latching is similar to the methods used for the hard tonneau.

A major disadvantage of the soft tonneau of either the conventional or tip-up type, is that in order to remove the tonneau it must be unfastened, rolled up, and then the bow supports and the rails attached to the cargo box have to be removed and stowed. This disassembly must be performed on the vehicle and the soft tonneau covers currently on the market cannot be removed from the vehicle as an assembly. This complex disassembly to remove the tonneau has met with consumer resistance in the marketplace.

Accordingly, it is an object of the present invention to provide a rail assembly for a tip-up soft tonneau which allows pivoting about the forward cargo box wall and retains the tonneau fabric.

It is a further object to provide a pivoting rail assembly which can be disassembled after partially opening the tonneau to allow removal of the soft tonneau assembled to a frame.

It is a still further object to provide a pivoting rail assembly which is self aligning to allow one person to reassemble the rail assembly.

SUMMARY OF THE INVENTION

The present invention provides a pivoting front rail assembly for a soft tonneau cover. The assembly consists of a base rail and a front rail.

The base rail is semi-permanently attached to the upper portion of the front or cab wall of a truck cargo box. The base rail includes a lower pivot of semi-circular profile having an open, unobstructed end portion and an upward projecting locking tongue.

The front rail is the forward component of a rectangular frame, comprised additionally of left and right side rails and a rear rail. The front rail includes an upper pivot, which cooperates with the lower pivot of the base rail to form a hinge. Additionally the front rail incorporates a groove which engages the locking tongue of the base rail to prevent disassembly of the upper pivot from the lower pivot when the tonneau cover is closed or opened in normal use. When the tonneau is opened to a sufficiently large angle so as to disengage the tongue of the base rail from the groove of the front rail, the joint can be disassembled. Once this unlocking angle is achieved, the upper pivot can disengage from the lower pivot, which includes an open, unobstructed end portion so as to allow for and not create an obstruction or hindrance to the removal of the entire tonneau cover while assembled to the frame. The front rail also provides an interface to retain a fabric fastener, typically of the J-hook or snap fastener type.

Thus, in ordinary use, the tonneau cover remains stretched and retained on the frame as a tonneau assembly. Opening and closing of the tonneau is accomplished in the same manner as a rigid tip-up tonneau by unlatching the rear portion of the frame and tilting the tonneau assembly. To remove the tonneau assembly, the tonneau is opened beyond the unlocking angle at which point the lower and upper pivots can be disengaged.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
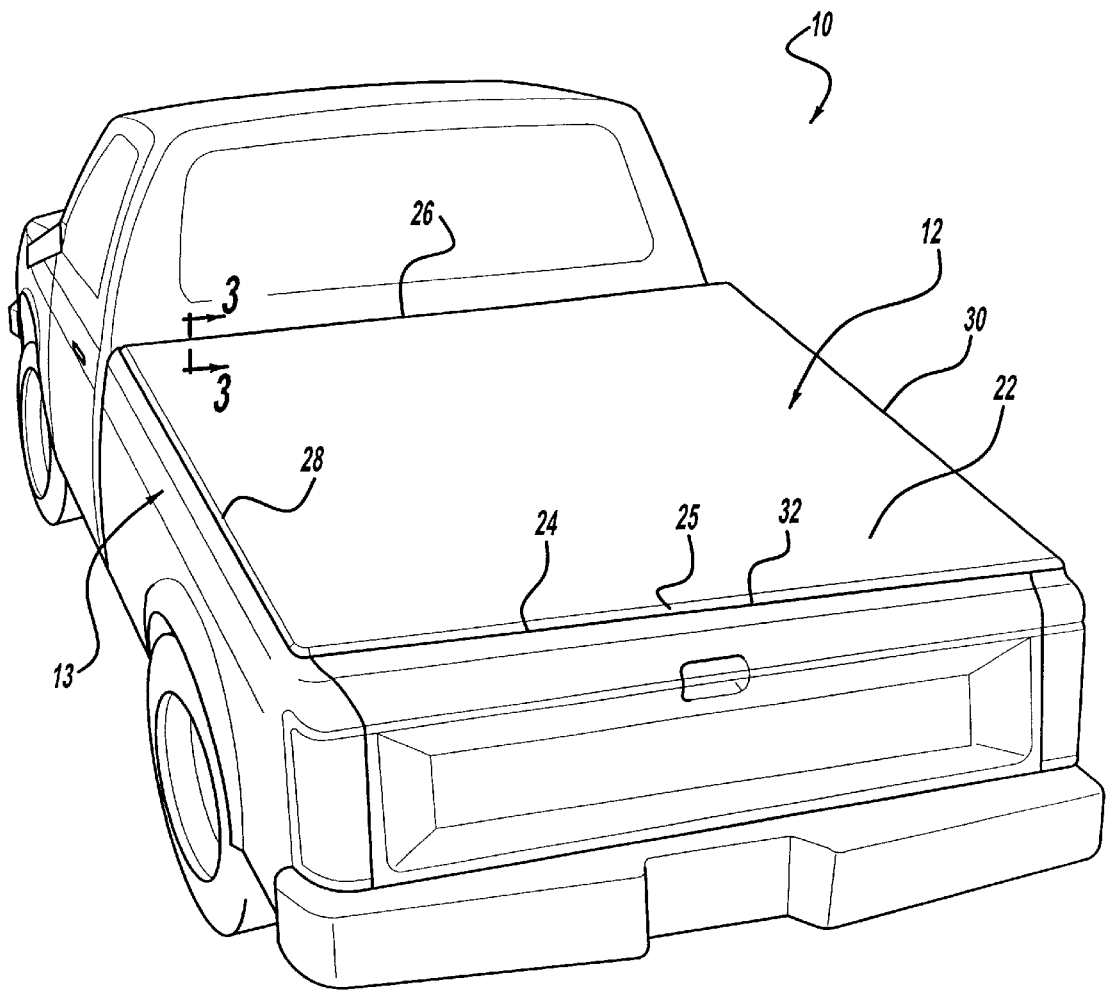
FIG. 1 is a perspective view of a pickup truck with cargo box having a tonneau cover according to the present invention installed thereon.
Figure 2:
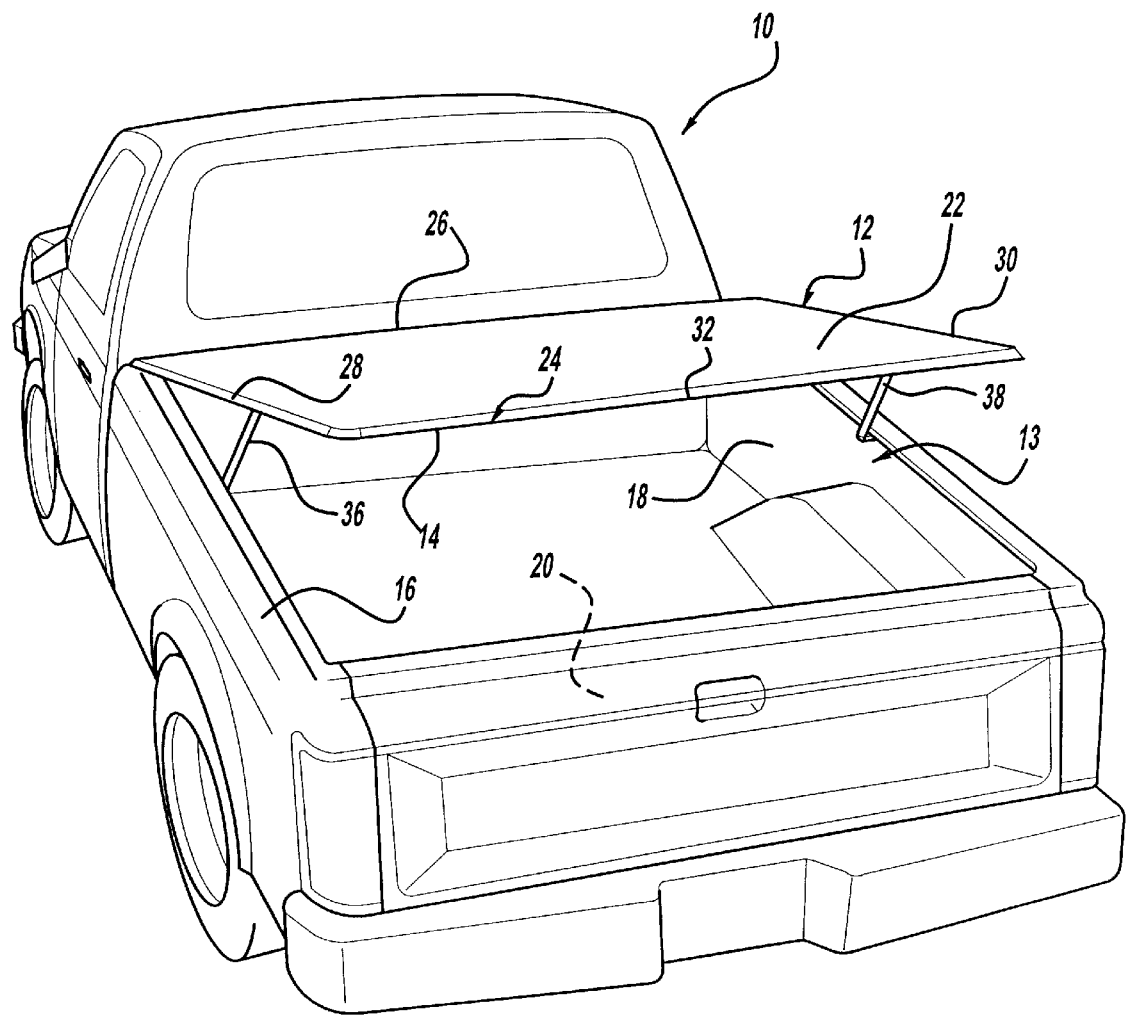
FIG. 2 is a perspective view of the pickup truck of FIG. 1 showing the tonneau cover in an open position.

With reference to FIG. 1 and FIG. 2, a pickup truck 10 is shown having a tonneau cover assembly 12 which is attached to the cargo box 13 according to the present invention. The cargo box 13 has front wall 14, left side wall 16, right side wall 18 and rear wall or tailgate 20. The tonneau cover assembly 12 includes a fabric cover 22 which is drawn tightly over a frame 24 and removeably attached to the frame 24. The frame 24 is comprised of a number of frame rails which are attached to one another to form the rectangular frame. The frame rails included are a front frame rail 26, a left side frame rail 28, a right side frame rail 30 and a rear frame rail 32. When closed, the rectangular frame 24 is aligned with the top of the cargo box sidewalls 16 and 18 as well as the top of the cargo box front wall 14 and tailgate 20. The frame 24 is attached by convention methods to the cargo box 13 at the front wall 14, the front rail 26 and specifically by a base rail 34 thereof which is in turn retained by clamping mechanisms or fasteners (not shown). The tonneau cover assembly 12 may include a latch assembly (not shown) at the rear of the frame 24 which engages with portions of the latch assembly secured to the tailgate 20.

When opened as shown in FIG. 2, the tonneau cover assembly 12 pivots about the base rail 34. In the open position, the tonneau cover assembly 12 is supported and limited in upward pivotal travel by the left and right gas strut assemblies 36 and 38.

Figure 3:
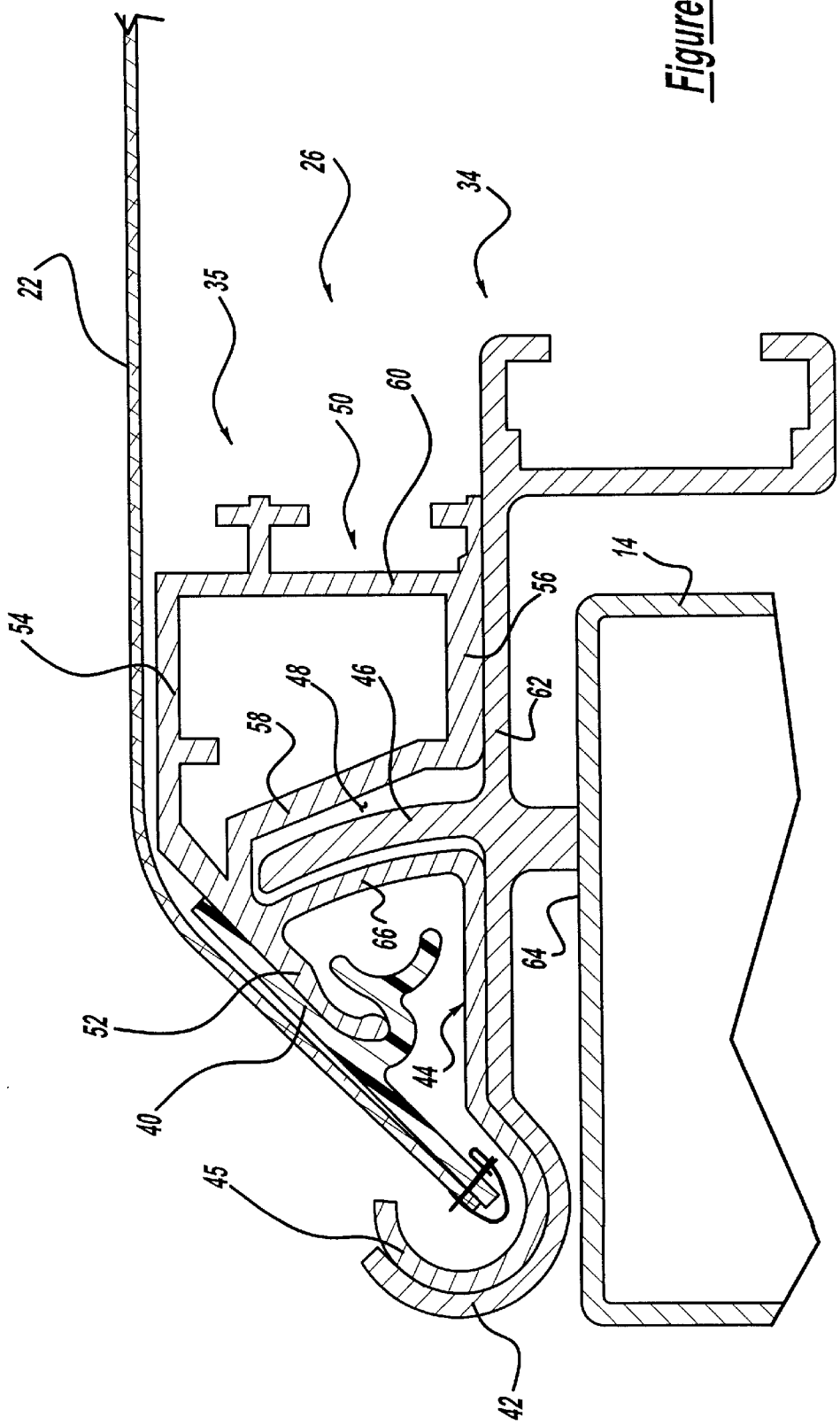
FIG. 3 is a sectional view along 3—3 in FIG. 1 showing the pivoting front rail assembly attached to the front wall of the cargo box and retaining the tonneau cover.

With reference to FIG. 3, front frame rail 26 is shown in cross section. Front frame rail 26 includes the base rail 34 mentioned above and two pivot rails 35. The base and pivot rails 34 and 35 are elongated members which extend substantially the width of the cargo box front wall 14 with a generally uniform cross section. Such rails can be economically manufactured as an aluminum extrusion. However, other materials and or manufacturing processes could be used to form the frame rail. The pivot rail 35 as shown in FIG. 3, includes a main body section 50 and a two part extension in the form of an attachment flange 52 and a pivot flange 44. The body section 50 is generally of a box-type construction having an upper wall 54, a lower wall 56, an outboard wall 58 and an inboard wall 60.

Extending forward off of the body section 50, generally at a downward angle, is the attachment flange 52. In the illustrated embodiment, the attachment flange 52 is designed to engage a J-hook fastener 40 to which the edge of the fabric cover 22 is folded over and attached, such as by sewing. Other methods of attachment, such as snap fasteners can also be used. In those instances, the male portion of the snap fastener is secured to the flange 52 while the female portion is secured to the fabric cover 22.

The base rail 34 has a semi-circular, open, unobstructed lower pivot 42 provided at its forward most end, which cooperates with a similarly shaped terminal end 45 of the pivot flange 44 of the front rail 26 to create a hinge that allows pivotal motion of the tonneau cover assembly 12 relative to the cargo box 13. The base rail 34 further includes a body portion 62 that contacts the top surface 64 of the cargo box's front wall 14. A tongue 46, illustrated as being arcuate, extends upward from the body portion 62 and into a conjugate groove 48 defined between a rear portion 66 of the pivot flange 44 and the outboard wall 58 of the body section 50.

Figure 4:
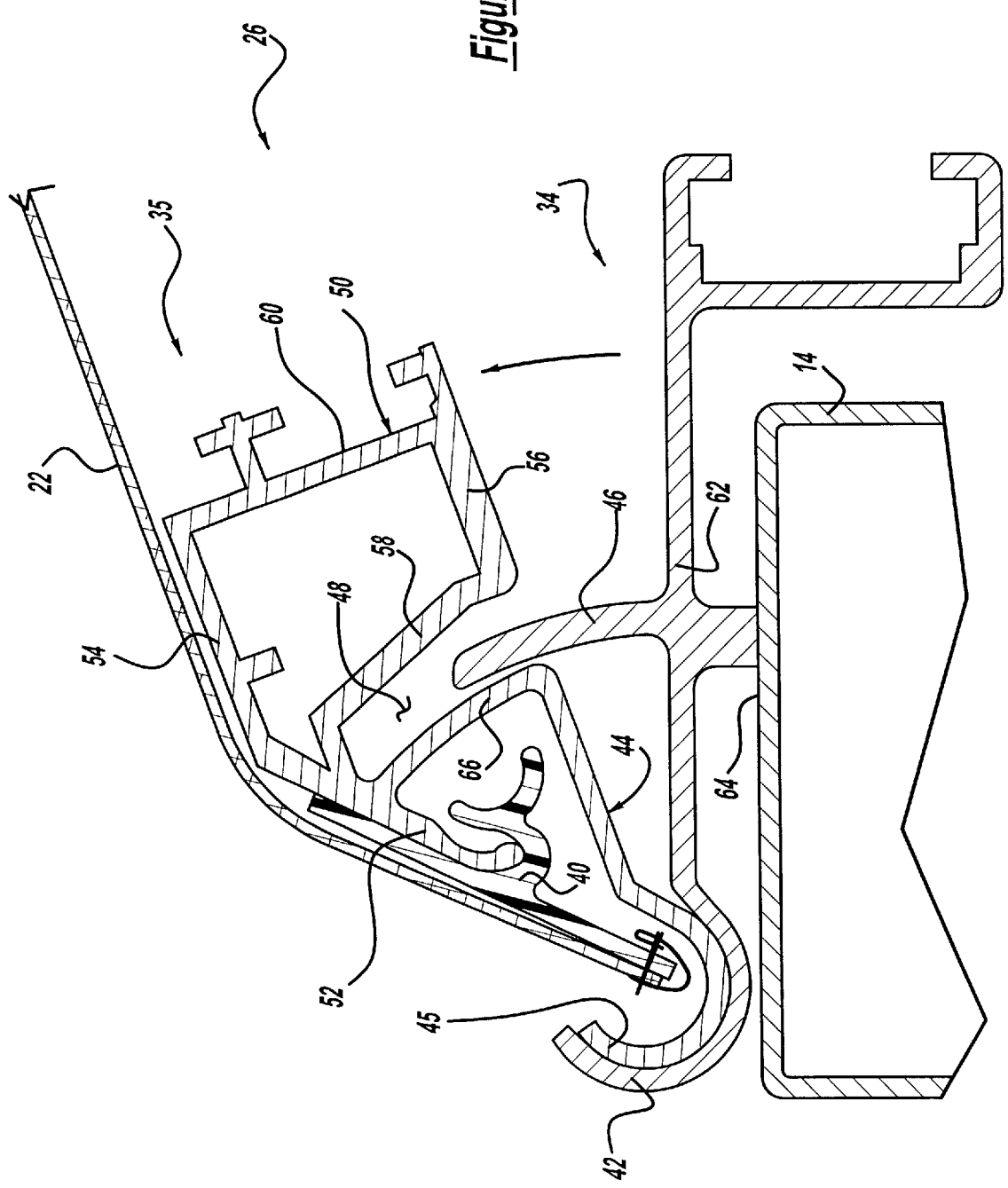
FIG. 4 is the same view as FIG. 3 showing the pivoting front rail assembly in the partially open position.

When the tonneau cover assembly 12 is lifted up to an open position, as shown in FIG. 4, the length of the tongue 46 is provided as such that it continues to be received within the groove 48. In this position, it is seen that the terminal end 45 of the pivot flange 44 rotates relative to the open, unobstructed lower pivot 42 of the base rail 34.

Figure 5:
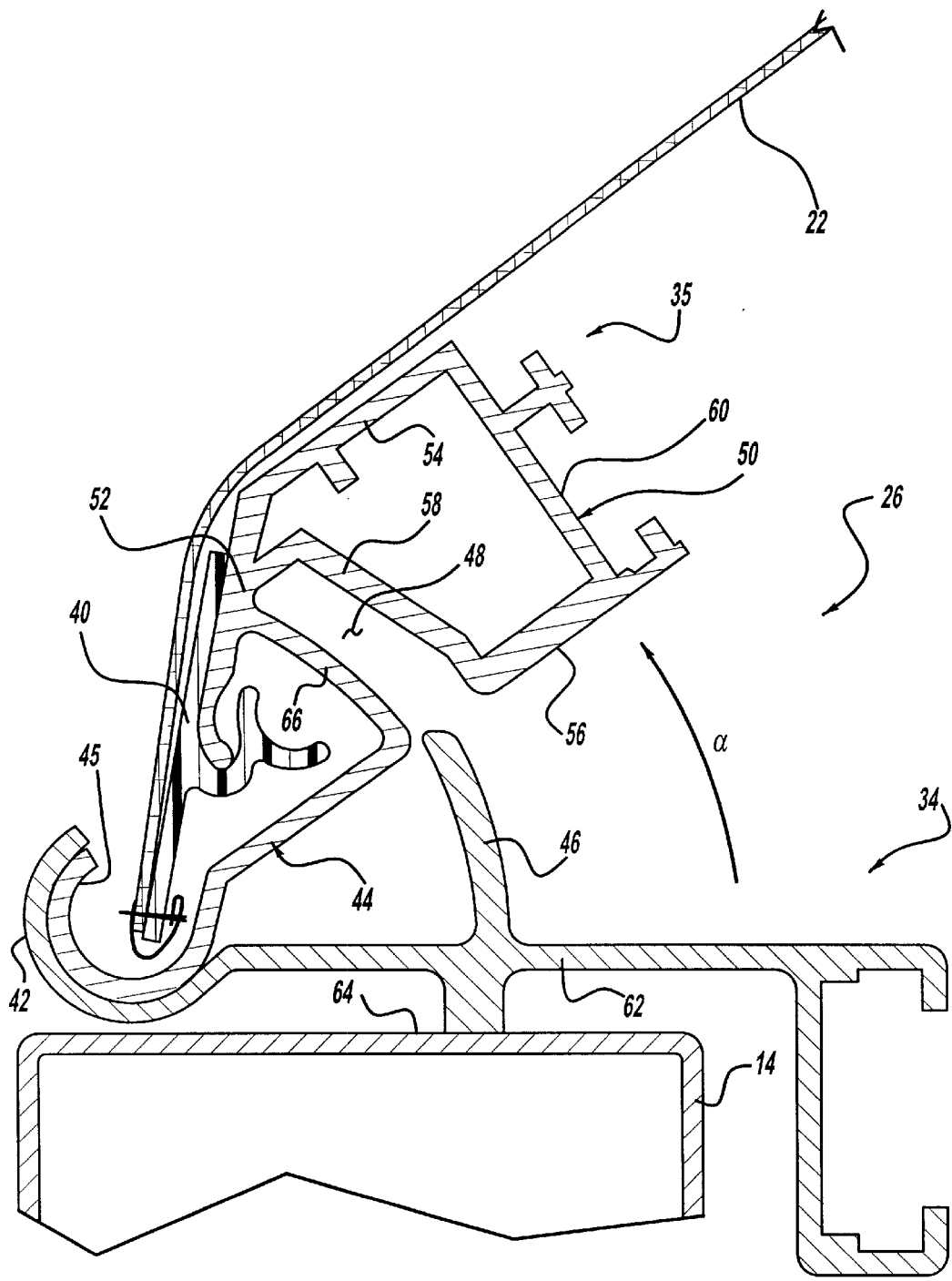
FIG. 5 is the same view as FIG. 3 showing the pivoting front rail assembly in the open position and capable of disassembly.
Figure 6:
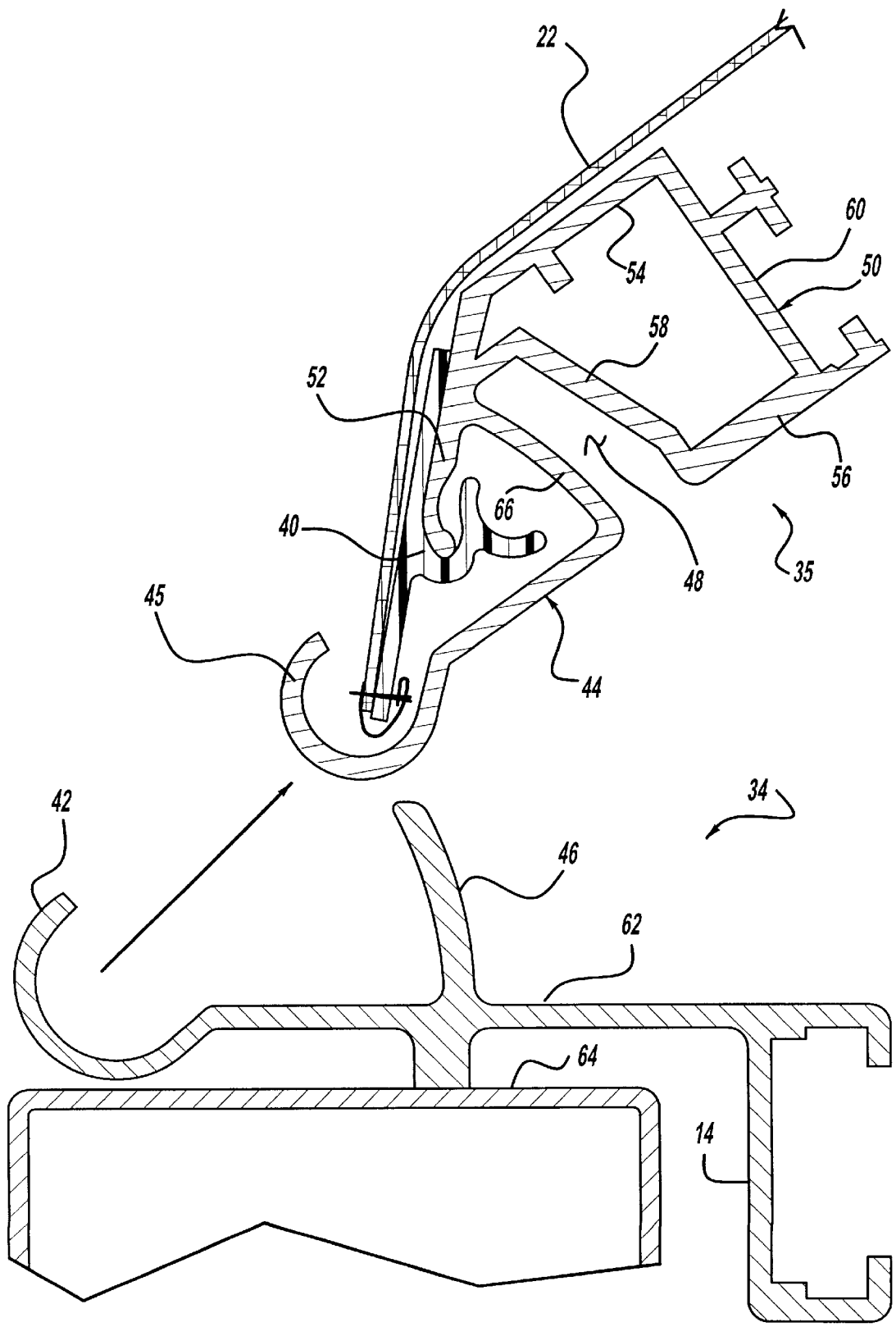
FIG. 6 is the same view as FIG. 3 showing the pivoting front rail assembly as the tonneau cover is removed.

Rotation or pivoting can continue beyond the open position until a removal position and unlocking angle is reached. At this angle, shown in FIG. 5, the tongue 46 is withdrawn out of the groove 48 and the pivot rail 35 can be disengaged from the base rail 34, in an upward and downward direction, as the open, unobstructed lower portion 42 allows for and does not create an obstruction or hindrance to the removal of the tonneau cover 22 and frame 24 as shown in FIG. 6.

The semi-circular shape of the lower pivot 42 guides the terminal end 44 into correct alignment during assembly. This facilitates to enable a single person to remove and assemble the cover 22 and frame 24 with the base rail 34. Also the semicircular channel formed by the terminal 44 over the length of the front rail 26 forms a "gutter" which channels water shed from the cover 22 toward and over the cargo box sidewalls 16 and 18 for drainage. This prevents water shed from the cover 22 from entering the cargo box 13.

The gas strut assemblies, 36 and 38 are sized to limit the opening travel of the tonneau cover assembly 12 to a point before which the unlocking angle is reached. In this manner the tonneau cover assembly 12 is held open by the gas struts 36 and 38 with the base rail 34 and the pivot rail 35 remaining assembled during normal use. Before removal of the cover 22 and frame 24, the gas strut assemblies 36 and 38 are uncoupled from the frame 24. Conventional mechanisms may be used to removeably connect the strut assemblies 36 and 38 to the frame 24.

The front rail 26 of the tonneau cover assembly 12 of the present invention allows a tip-up soft tonneau to open like a hard tonneau by pivoting about the cargo box front wall. A removal precaution mechanism (the tongue 46 and groove 48) allow normal pivoting use where removal is prevented and also allows movement beyond an open angle where removal of the soft tonneau by a single person is permitted.

It is to be understood that the invention is not limited to the exact construction illustrated and described above, but that various changes and modifications may be made without departing from the spirit and scope of the invention as defined in the following claims.

I claim:

1. A pivoting rail assembly for use in a tonneau cover for covering an area of a vehicle, the vehicle area being bounded by spaced walls, the walls including a forward wall, side walls and a rear wall, said pivoting rail assembly comprising:

an elongated base rail including a body portion for engaging a top surface of the forward wall, said body portion having a first pivot portion and a first conjunct feature, said first pivot portion having an open, unobstructed forward end portion;

a pivot rail including a body section, said body section having a second pivot portion and a second conjunct feature;

said first and second pivot portions being cooperatively engaged and permitting relative rotational movement of said base rail and said pivot rail between a closed position, an open position and a release position;

said first and second conjunct features being cooperatively engaged in said closed and open positions whereby said pivot rail is prevented from disengaging said base rail in said closed and open positions; and said first and second conjunct features not being cooperatively engaged in said release position whereby said pivot rail is disengageable from said base rail in said release position, said first and second conjunct features not being cooperatively engaged solely as a result of movement of said base rail and said pivot rail into said release position.

2. The pivoting rail of claim 1 wherein said first conjunct feature is a protuberance on said body portion of said base rail and said second conjunct feature is a recessed portion in said pivot rail.

3. The pivoting rail of claim 2 wherein said protuberance is a tongue extending substantially the length of said base rail.

4. The pivoting rail of claim 2 wherein said recessed portion is located on said pivot rail to receive said protuberance therein when said pivot and base rails are in said closed and open positions.

5. The pivoting rail of claim 4 wherein said recessed portion is a groove extending substantially the length of said base rail.

6. The pivoting rail of claim 1 further comprising mounting means for mounting a cover to said pivoting rail assembly.

7. The pivoting rail of claim 6 wherein said mounting means is on said pivot rail.

8. The pivoting rail of claim 6 wherein said mounting means includes a flange on said pivot rail.

9. The pivoting rail of claim 1 wherein said first and second pivot portions are semi-circular in shape, said second pivot portion having an effective outer diameter being less than an effective inner diameter of said first pivot.

10. The pivoting rail of claim 1 wherein said first and second pivot portions are cooperatively engaged in a rested arrangement.

11. The pivoting rail of claim 1 wherein said first and second pivot portions extend substantially the lengths of said base and pivot rails.

12. The pivoting rail of claim 9 wherein said first pivot portion defines an open end through which said second pivot portion is received.

13. The pivoting rail of claim 4 wherein said second pivot portion defines a channel extending substantially the length of said pivot rail, said channel having open ends and an open top.

14. The pivoting rail of claim 13 wherein an end of a cover attached to said pivoting rail is received within said channel.

15. A tonneau cover assembly for covering a cargo box of a pick-up truck, the cargo box being bounded by spaced walls, including a forward wall toward a cab of the truck, side walls and a rear wall, said tonneau cover assembly comprising:

a frame having a plurality of frame rails, including a forward rail, side rails and a rear rail, said frame rails being joined to one another at ends thereof to form said frame in a rectangular shape, said frame for positioning on top surfaces of said spaced walls;

a cover of a flexible sheet material attached to said frame;

said forward rail including a base rail and a pivot rail; and an elongated base rail including a body portion for engaging a top surface of the forward wall, said body portion having a first pivot portion and a first conjunct feature, said first pivot portion having an open, unobstructed forward end portion;

a pivot rail including a body section, said body section having a second pivot portion and a second conjunct feature;

said first and second pivot portions being cooperatively engaged and permitting relative rotational movement of said base rail and said pivot rail between a closed position, an open position and a release position;

said first and second conjunct features being cooperatively engaged in said closed and open positions whereby said pivot rail is prevented from disengaging said base rail in said closed and open positions; and said first and second conjunct features not being cooperatively engaged in said release position whereby said pivot rail is disengageable from said base rail in said release position, said first and second conjunct features not being cooperatively engaged solely as a result of movement of said base rail and said pivot rail into said release position.

* * * * *

UNITED STATES PATENT AND TRADEMARK OFFICE
CERTIFICATE OF CORRECTION

PATENT NO.    : 6,439,640 B1
DATED         : August 27, 2002
INVENTOR(S)   : Donald G. Wheatley It is certified that error appears in the above-identified patent and that said Letters Patent is hereby corrected as shown below:

Column 4,
Line 60, after "unobstructed" delete "forward".

Column 6,
Line 25, after "unobstructed" delete "forward".

Signed and Sealed this

Twenty-first Day of December, 2004

JON W. DUDAS
*Director of the United States Patent and Trademark Office*